United States Patent
Takaoka et al.

(10) Patent No.: US 12,480,434 B2
(45) Date of Patent: Nov. 25, 2025

(54) CONTROL DEVICE FOR INTERNAL COMBUSTION ENGINE

(71) Applicant: TOYOTA JIDOSHA KABUSHIKI KAISHA, Toyota (JP)

(72) Inventors: Kazuya Takaoka, Machida (JP); Tsuyoshi Obuchi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/975,532

(22) Filed: Dec. 10, 2024

(65) Prior Publication Data

US 2025/0283424 A1   Sep. 11, 2025

(30) Foreign Application Priority Data

Mar. 7, 2024 (JP) ................. 2024-035128

(51) Int. Cl.
*F01N 9/00* (2006.01)
*F01N 11/00* (2006.01)

(52) U.S. Cl.
CPC ............ *F01N 9/002* (2013.01); *F01N 11/002* (2013.01); *F01N 2550/04* (2013.01);
(Continued)

(58) Field of Classification Search
CPC ........ F01N 9/002; F01N 11/002; F01N 11/00; F01N 2550/04; F01N 3/035; F01N 2900/1606; F01N 2900/1406; F01N 2560/08; F01N 3/023; F01N 2900/04; F01N 2900/0402; F01N 2900/06; F01N 2900/10; F02D 2200/0812; F02D 41/1448; F02D 41/1446
See application file for complete search history.

(56) References Cited

FOREIGN PATENT DOCUMENTS

| | | | |
|---|---|---|---|
| CN | 104100341 A | * 10/2014 | |
| JP | 2008190538 A | * 8/2008 | ............ F01N 11/002 |
| JP | 2011-220233 A | 11/2011 | |

OTHER PUBLICATIONS

English Translation to CN104100341A (Year: 2014).*
English Translation to JP2008190538 (Year: 2008).*

* cited by examiner

*Primary Examiner* — Anthony Ayala Delgado
(74) *Attorney, Agent, or Firm* — SoraIP, Inc.

(57) ABSTRACT

A control device for an internal combustion engine includes a filter for collecting PM in an exhaust pipe connected to an engine body, and a PM regeneration function for regenerating the filter for collecting PM. The control device of the internal combustion engine includes a filter differential pressure acquisition unit that acquires a filter differential pressure, a pre-regeneration filter differential pressure acquired by the filter differential pressure acquisition unit prior to regeneration of the filter, a pre-post regeneration differential pressure difference acquisition unit that acquires a pre-regeneration differential pressure difference that is a difference between a post-regeneration filter differential pressure acquired by the filter differential pressure acquisition unit after regeneration of the filter, and a PM generation function determination unit that performs an anomaly determination of PM regeneration function when the acquired pre-regeneration differential pressure difference is equal to or less than a preset threshold.

5 Claims, 6 Drawing Sheets

(52) U.S. Cl.
CPC ............... *F01N 2900/0601* (2013.01); *F01N 2900/1406* (2013.01); *F01N 2900/1411* (2013.01); *F01N 2900/1606* (2013.01)

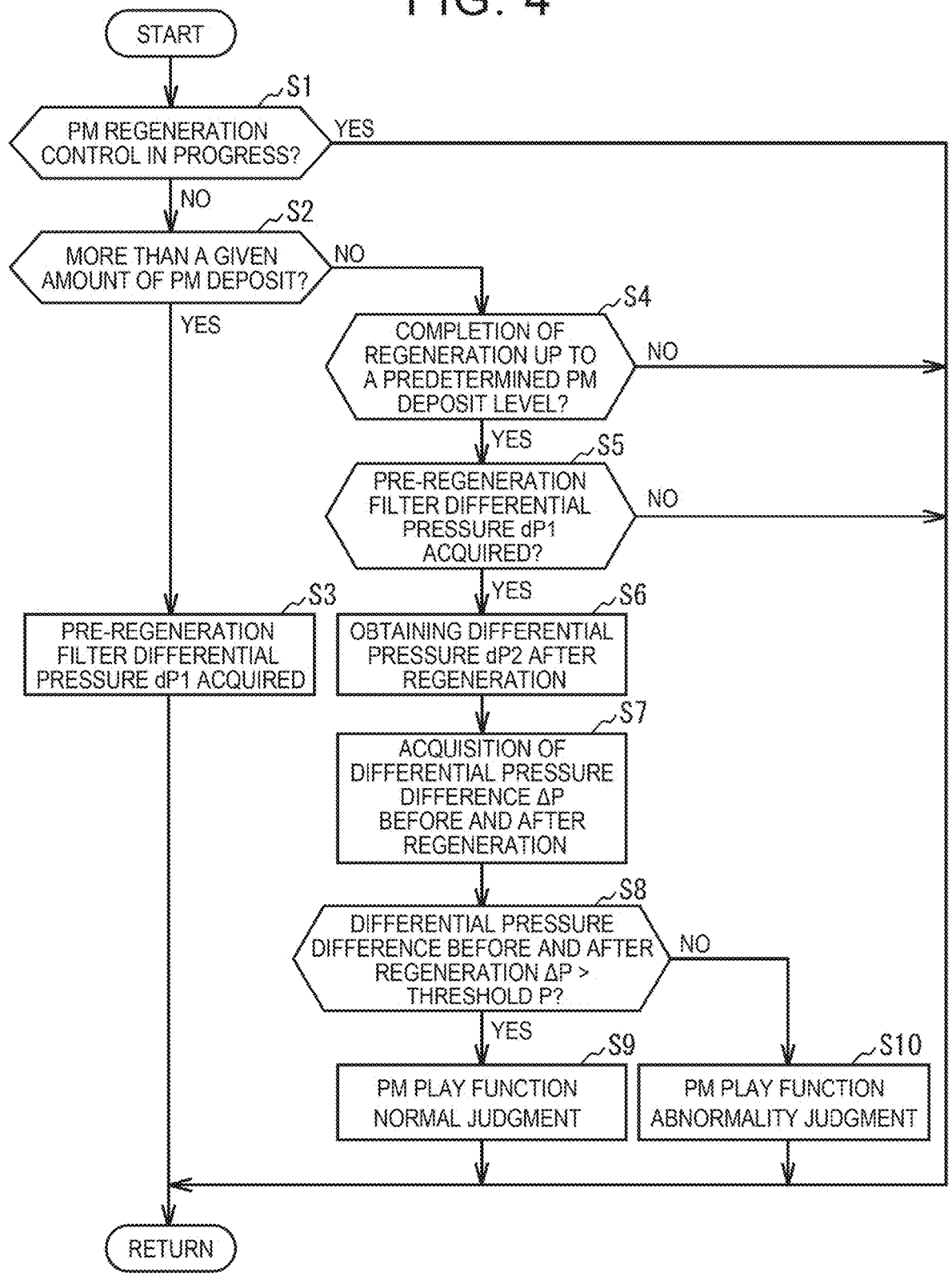

CONTROL DEVICE FOR INTERNAL COMBUSTION ENGINE

CROSS-REFERENCE TO RELATED APPLICATION

This application claims priority to Japanese Patent Application No. 2024-035128 filed on Mar. 7, 2024, incorporated herein by reference in its entirety.

BACKGROUND

1. Technical Field

The present disclosure relates to a control device for an internal combustion engine.

2. Description of Related Art

There has hitherto been known an internal combustion engine that includes a filter provided in an exhaust passage of the internal combustion engine to trap particulate matter (PM) in an exhaust gas. The filter that has trapped predetermined PM is subjected to a regeneration process. The filter is exposed to a high temperature during the regeneration process. As a result, the filter may be damaged or melted. Japanese Unexamined Patent Application Publication No. 2011-220233 (JP 2011-220233 A), for example, proposes determining the presence or absence of a failure of a filter based on the pressure difference between the upstream side and the downstream side of the filter in a state in which a regeneration process is completed.

SUMMARY

When an internal combustion engine has a PM regeneration function, it may be necessary to make an abnormality determination as to whether an abnormality is caused in the regeneration function. As a method of determining an abnormality in the regeneration function, it is conceivable to use the pressure difference between the upstream side and the downstream side of the filter as disclosed in JP 2011-220233 A. However, the pressure difference between the upstream side and the downstream side of the filter may be affected by variations in tolerance during manufacture of the filter or aging of the filter. When the pressure difference between the upstream side and the downstream side of the filter is affected by the variations in tolerance or the aging as described above, there is a possibility that an abnormality in the regeneration function is erroneously determined.

Thus, the disclosure disclosed in the present specification addresses an issue of avoiding erroneously determining an abnormality in the function to regenerate a filter.

An aspect of the present disclosure provides a control device for an internal combustion engine, in which an exhaust pipe connected to an engine body is provided with a filter that traps particulate matter (PM), the control device including a PM regeneration function to regenerate the filter that has trapped the PM.

The control device for an internal combustion engine includes: a filter differential pressure acquisition unit that acquires a filter differential pressure that is a front-rear differential pressure of the filter;

a pre-post regeneration differential pressure difference acquisition unit that acquires a pre-post regeneration differential pressure difference that is a difference between a pre-regeneration filter differential pressure acquired by the filter differential pressure acquisition unit before regeneration of the filter and a post-regeneration filter differential pressure acquired by the filter differential pressure acquisition unit after regeneration of the filter; and a PM generation function determination unit that determines an abnormality in the PM regeneration function when the pre-post regeneration differential pressure difference acquired by the pre-post regeneration differential pressure difference acquisition unit is equal to or less than a threshold value set in advance.

In an aspect, the filter differential pressure acquisition unit may acquire the pre-regeneration filter differential pressure when a PM accumulation amount estimated by a PM accumulation amount estimation unit is equal to or more than a first predetermined value, and acquire the post-regeneration filter differential pressure when a PM accumulation amount estimated by the PM accumulation amount estimation unit after start of operation of the PM regeneration function is equal to or less than a second predetermined value that is less than the first predetermined value.

In an aspect, the control device for an internal combustion engine may further include a filter differential pressure correction unit including a volume flow rate calculation unit that calculates a volume flow rate at a time when the pre-regeneration filter differential pressure is acquired and a volume flow rate at a time when the post-regeneration filter differential pressure is acquired, the filter differential pressure correction unit correcting the pre-regeneration filter differential pressure and the post-regeneration filter differential pressure such that the volume flow rates calculated by the volume flow rate calculation unit have the same value; and the pre-post regeneration differential pressure difference acquisition unit may acquire a difference between the pre-regeneration filter differential pressure and the post-regeneration filter differential pressure corrected by the filter differential pressure correction unit.

In an aspect, the volume flow rate calculation unit may acquire the volume flow rate at the time of acquisition of the pre-regeneration filter differential pressure based on a temperature and a flow rate of a gas that has passed through the filter at the time of acquisition of the pre-regeneration filter differential pressure, and acquire the volume flow rate at the time of acquisition of the post-regeneration filter differential pressure based on a temperature and a flow rate of a gas that has passed through the filter at the time of acquisition of the post-regeneration filter differential pressure.

In an aspect, the pre-post regeneration differential pressure difference acquisition unit may acquire the pre-post regeneration differential pressure difference in a region in which the volume flow rate is equal to or more than a predetermined value.

According to the disclosure disclosed in the present specification, it is possible to avoid erroneously determining an abnormality in the function to regenerate a filter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating an example of control according to the first embodiment;

DETAILED DESCRIPTION OF EMBODIMENTS

Hereinafter, embodiments of the present disclosure will be described with reference to the accompanying drawings.

First Embodiment

Internal Combustion Engine

Figure 1A:
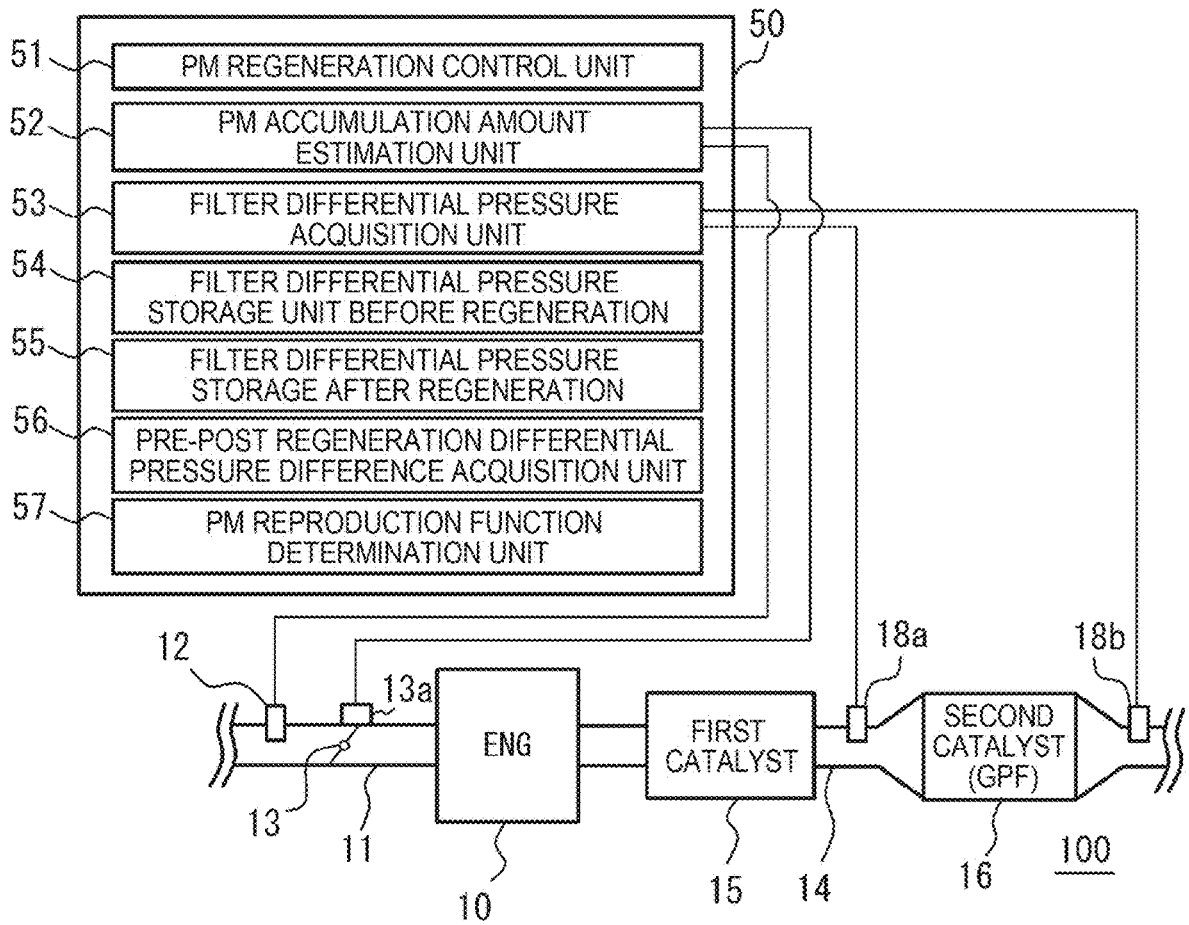
FIG. 1A is a schematic view of an internal combustion engine incorporating a control device according to a first embodiment.

As illustrated in FIG. 1A, the internal combustion engine 100 includes an intake pipe 11 and an exhaust pipe 14 connected to the engine body 10. The intake pipe 11 is provided with an airflow meter 12 and a throttle valve 13. The throttle valve 13 is provided with a throttle valve opening degree sensor 13a. The exhaust pipe 14 is provided with the first catalyst 15 and the second catalyst 16 in order from the side close to the engine body 10. In addition, the internal combustion engine 100 includes an ECU (Electronic Control Unit) 50 that functions as a control device. The internal combustion engine 100 is mounted on a vehicle. The vehicles may be hybrid electric vehicle. In this case, the internal combustion engine 100 is combined with a motor or a battery (not shown) to form a hybrid system.

The engine body 10 in the present embodiment is a gasoline engine using gasoline as a fuel. Gasoline engines may generate PM by direct injection of fuel. The engine body 10 may be a diesel engine that uses light oil as a fuel. PM can also occur in diesel engines.

The airflow meter 12 detects an amount of intake air that flows through the intake pipe 11 and is fed to the engine body 10. The throttle valve 13 adjusts an amount of intake air fed to the engine body 10. The throttle valve opening degree sensor 13a detects the opening degree of the throttle valve 13.

The first catalyst 15 is a three-way catalyst. The first catalyst 15 generates heat during regeneration control of the second catalyst 16. The temperature of the second catalyst 16 rises due to the heat generated by the first catalyst 15. As the temperature of the second catalyst 16 rises, PM deposited on the second catalyst 16 burns out. Thus, the second catalyst 16 is regenerated.

The second catalyst 16 is GPF (Gasoline Particulate Filter). When the engine body 10 is a diesel engine, a DPF (Diesel Particulate Filter) is provided instead of GPF. GPF and DPF collect PM discharged from the body 10. When clogging occurs due to the collected PM, PM collecting function of the second catalyst 16 is deteriorated. Therefore, the second catalyst 16 is subjected to a regeneration treatment under a predetermined condition.

A first pressure sensor 18a is provided upstream of the second catalyst 16. The first pressure sensor 18a detects a pressure $P_{upst}$ upstream of the second catalyst 16. A second pressure sensor 18b is provided downstream of the second catalyst 16. The second pressure sensor 18b detects a pressure $P_{downst}$ downstream of the second catalyst 16.

ECU 50 includes CPU (Central Processing Unit), RAM (Random Access Memory), ROM (Read Only Memory), and a storage device. ECU 50 executes a program stored in a ROM or a storage device to control the internal combustion engine 100. Although not described here, a large number of sensors for controlling the internal combustion engine 100 are connected to ECU 50.

ECU 50 functions as a PM regeneration control unit 51 and a PM accumulation amount estimation unit 52. ECU 50 functions as a filter differential pressure acquisition unit 53, a pre-regeneration filter differential pressure storage unit 54, and a post-regeneration filter differential pressure storage unit 55. ECU 50 functions as a pre-post regeneration differential pressure difference acquisition unit 56 and a PM regeneration function determining unit 57.

PM regeneration control unit 51 performs control for PM regeneration in the second catalyst 16. PM reproduction control unit 51 may employ various conventionally known methods for PM reproduction. For example, PM regeneration control unit 51 can perform F/C (Fuel Cut) control or forcibly perform lean operation. Further, PM reproduction control unit 51 may instruct the driver to perform high-load operation for promoting PM reproduction, for example. When the engine body 10 is a diesel engine, PM regeneration control unit 51 may execute post injection.

PM accumulation amount estimation unit 52 estimates PM deposition amount in the second catalyst 16. An airflow meter 12 and a throttle valve opening degree sensor 13a are electrically connected to PM accumulation amount estimation unit 52. PM accumulation amount estimation unit 52 estimates PM accumulation amount using an estimation model that uses the detected values of these sensors as parameters. The estimation model is created by an experiment or a simulation. PM accumulation amount estimation unit 52 can use a conventionally known estimator. Therefore, a detailed description of the estimation model is omitted in this specification. PM accumulation amount estimation unit 52 also estimates PM deposition amount after PM regeneration is performed. PM accumulation after PM regeneration is performed can be estimated based on, for example, the degree of progress of PM regeneration by PM regeneration control unit 51.

Figure 2A:
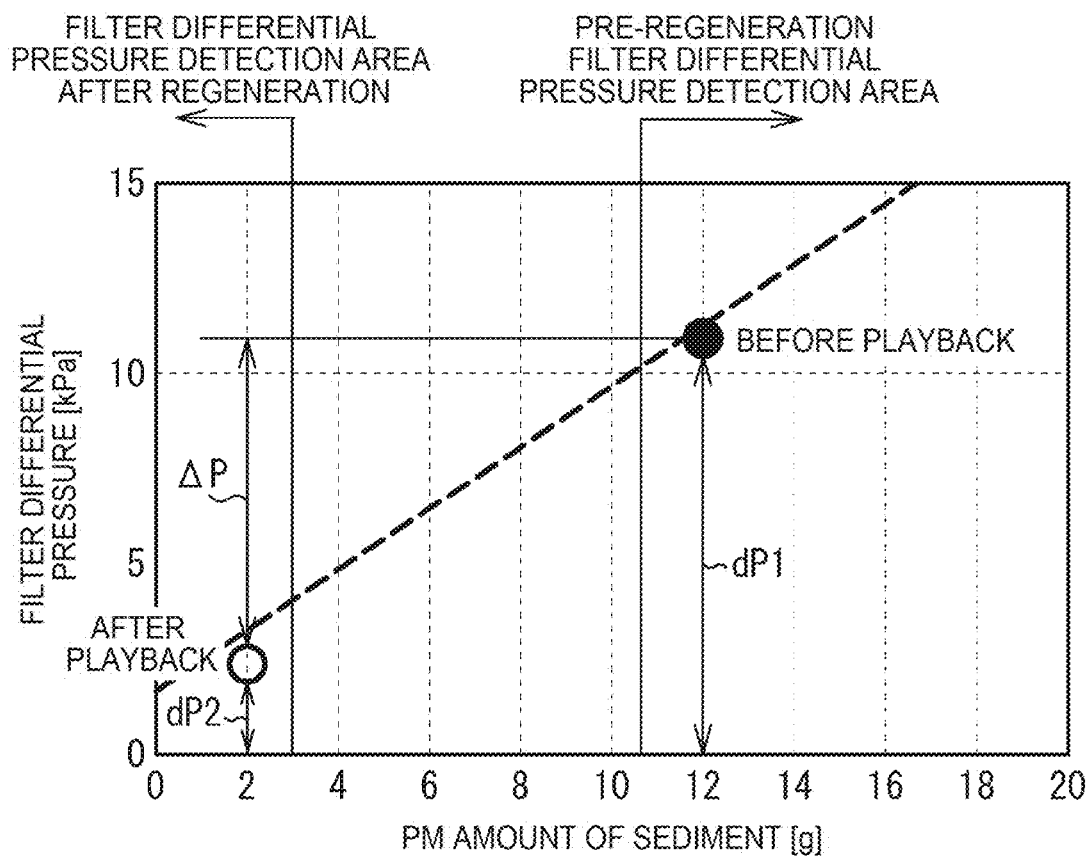
FIG. 2A is a graph illustrating the relation among the filter differential pressure before regeneration, the filter differential pressure after regeneration, and the differential pressure before and after regeneration.

The first pressure sensor 18a and the second pressure sensor 18b are electrically connected to the filter differential pressure acquisition unit 53. The filter differential pressure acquisition unit 53 calculates the filter differential pressure by subtracting the pressure $P_{upst}$ at the downstream side of the second catalyst 16 detected by the second pressure sensor 18b from the pressure $P_{downst}$ at the upstream side of the second catalyst 16 detected by the first pressure sensor 18a. As illustrated in FIG. 2A, there are two types of filter differential pressures: a pre-regeneration filter differential pressure dP1 and a post-regeneration filter differential pressure dP2. The pre-regeneration filter differential pressure dP1 is a differential pressure obtained when a large amount of PM is deposited on the second catalyst 16 prior to PM regeneration. The post-regeneration filtered differential pressure dP2 is a differential pressure obtained after PM regeneration is performed and PM process proceeds.

The pre-regeneration filter differential pressure storage unit 54 stores pre-regeneration filter differential pressure dP1.

The post-regeneration filter differential pressure storage unit 55 stores the post-regeneration filter differential pressure dP2.

The pre-post regeneration differential pressure difference acquisition unit 56 acquires a pre-regeneration differential pressure difference ΔP. The pre-regeneration and post-regeneration differential pressure difference ΔP is a difference between the pre-regeneration filter differential pressure dP1 and the post-regeneration filter differential pressure dP2 as illustrated in FIG. 2A.

Figure 2B:
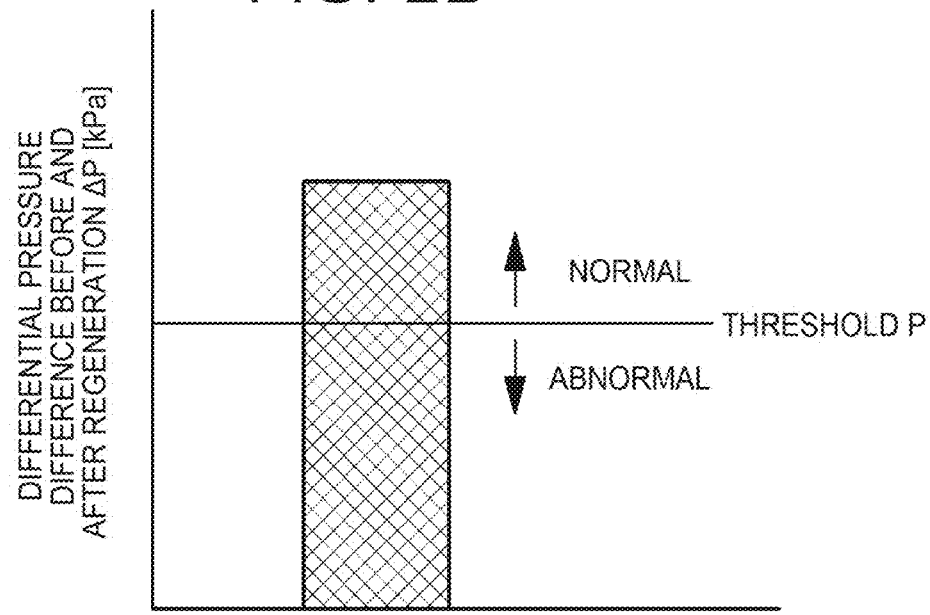
FIG. 2B is a diagram illustrating an abnormal determination of a PM regeneration function based on a differential pressure difference before and after regeneration.

PM regeneration function determination unit 57 determines whether or not the pre-regeneration differential pressure difference ΔP is greater than a preset threshold P. PM regeneration function determination unit 57 determines that PM regeneration function is normal when the pre-regeneration differential pressure difference ΔP is greater than the threshold P, as illustrated in FIG. 2B. PM regeneration function determination unit 57 determines that PM regeneration function is abnormal when the pre-regeneration differential pressure difference ΔP is equal to or less than the threshold P. The threshold P is set in advance by an experiment or a simulation. The threshold P is set from the viewpoint of whether the differential pressure difference ΔP before and after regeneration according to the content of the executed PM regeneration control is obtained.

Figure 3:
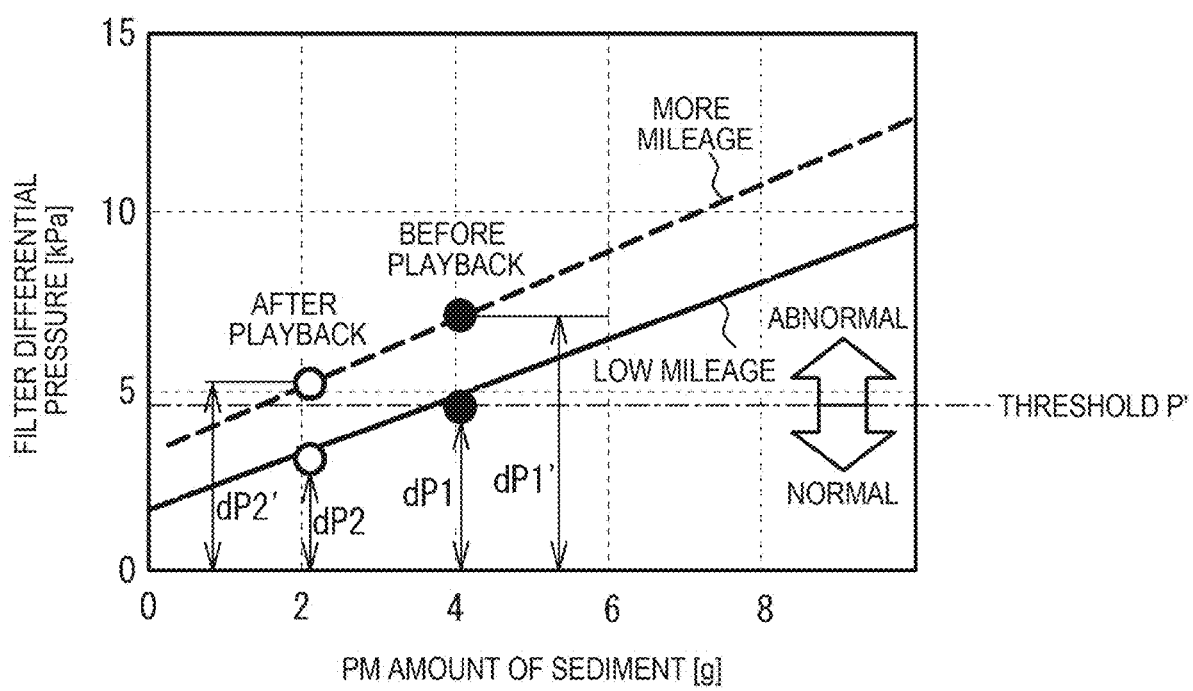
FIG. 3 is a chart illustrating differences in pre-regeneration filter differential pressure and post-regeneration filter differential pressure due to aging of GPF.

Here, referring to FIG. 3, an advantage of determining PM regeneration function using the differential pressure difference ΔP before and after regeneration will be described. In FIG. 3, the filter differential pressure in the second catalyst 16 of the vehicle having a small travel distance is illustrated by a solid line. In FIG. 3, the filter differential pressure in the second catalyst 16 of the vehicle having a large travel distance is illustrated by a broken line. It is considered that the second catalyst 16 of the vehicle having a large travel distance is aged. The aging in the second catalyst 16 proceeds, for example, by the deposition of ash. The ash is, for example, a metal component contained in the fuel. Ash tends to accumulate with the accumulation of travel distances. Ash cannot be removed by PM regeneration. Therefore, even if PM regeneration function is normal, the differential pressure of the filters may be detected high.

As illustrated in FIG. 3, it is assumed that PM deposit in the second catalyst 16 prior to regeneration is 4 g. The pre-regeneration filter differential pressure dP1' in a vehicle having a large travel distance is larger than the pre-regeneration filter differential pressure dP1 in a vehicle having a small travel distance. Further, it is assumed that the amount of PM deposited in the second catalyst 16 after regeneration is 2 g. The post-regeneration filter differential pressure dP2' in a vehicle having a large travel distance is larger than the post-regeneration filter differential pressure dP2 in a vehicle having a small travel distance. Here, it is assumed that PM regeneration function is determined based on whether the filtered differential pressure after regeneration is greater than the threshold P'. In this case, since the post-regeneration filter differential pressure dP2 is smaller than the threshold P', it is determined that PM regeneration function is normal. On the other hand, in vehicles having a large travel distance, since the post-regeneration filter differential pressure dP2' is larger than the threshold P', it is determined that PM regeneration function is abnormal. PM regeneration amount in a vehicle having a large travel distance is equal to PM regeneration amount in a vehicle having a small travel distance. In other words, there is a possibility that an erroneous determination is made that PM reproduction function in vehicles having a large traveling range is abnormal despite being normally performed. Such an erroneous determination may occur due to a product error (tolerance) that occurs when the second catalyst 16 is manufactured.

When the differential pressure difference ΔP before and after regeneration is compared with the threshold P as in the present embodiment, erroneous determination can be avoided.

PM Reproduction Function Determination

Referring to the flow chart illustrated in FIG. 4, PM reproduction function determination in the first embodiment will be described. FIGS. 2A and 2B are referred to as appropriate.

In S1, ECU 50 determines whether PM reproduction control unit 51 is performing PM reproduction control. This is because PM reproduction function cannot be determined during PM reproduction control. When a negative determination (No determination) is made in S1, ECU 50 proceeds to S2. ECU 50 repeats the process from S1 when an affirmative determination (Yes determination) is made in S1.

In S2, ECU 50 determines whether or not a first predetermined PM or more is deposited on the second catalyst 16 based on PM deposition amount estimated by PM accumulation amount estimation unit 52. Specifically, ECU 50 determines whether the estimated PM deposit is in the pre-regeneration filter differential pressure detecting area shown in FIG. 2A. The pre-regeneration filter differential pressure detecting region is set as a region in which the pre-regeneration filter differential pressure dP1 that can calculate the pre-regeneration differential pressure ΔP used in PM regeneration function determination is detected. When an affirmative determination is made in S2, ECU 50 proceeds to S3. When a negative determination is made in S2, ECU 50 proceeds to S4.

In S3, the filter differential pressure acquisition unit 53 obtains the pre-regeneration filter differential pressure dP1. The obtained pre-regeneration filter differential pressure dP1 is stored in the pre-regeneration filter differential pressure storage unit 54. After S3 process, ECU 50 repeats the process from S1.

In S4, ECU 50 determines, based on PM deposition amount estimated by PM accumulation amount estimation unit 52, whether or not the regeneration of the second catalyst 16 has been completed until PM deposition amount is equal to or less than a second predetermined value. Specifically, ECU 50 determines whether the estimated PM deposit is in the post-regeneration filtered differential pressure detecting area shown in FIG. 2A. The post-regeneration filter differential pressure detecting region is set as a region in which the post-regeneration filter differential pressure dP2 that can calculate the pre-regeneration differential pressure ΔP used in PM regeneration function determination is detected. When an affirmative determination is made in S4, ECU 50 proceeds to S5. When a negative determination is made in S4, ECU 50 repeats the process from S1.

In S5, ECU 50 determines whether the pre-regeneration filtered differential pressure dP1 has been acquired. If it is through S3, ECU 50 makes a positive determination. On the other hand, when S3 is not passed, ECU 50 makes a negative determination. When an affirmative determination is made in S5, ECU 50 proceeds to S6. When a negative determination is made in S5, ECU 50 repeats the process from S1.

In S6, the filter differential pressure acquisition unit 53 obtains the post-regeneration filter differential pressure dP2. The obtained post-regeneration filter differential pressure dP2 is stored in the post-regeneration filter differential pressure storage unit 55. ECU 50 proceeds to S7 after S6 process.

In S7, the pre-post regeneration differential pressure difference acquisition unit 56 acquires the pre-regeneration differential pressure difference ΔP. The pre-post regeneration differential pressure difference acquisition unit 56 subtracts the post-regeneration filter differential pressure dP2 stored in the post-regeneration filter differential pressure storage unit 55 from the pre-regeneration filter differential pressure dP1 stored in the pre-regeneration filter differential pressure storage unit 54. ECU 50 proceeds to S8 after S7.

In S8, PM regeneration function determination unit 57 determines whether or not the pre-regeneration differential pressure difference ΔP is greater than the threshold P. PM reproduction function determination unit 57 determines that S8 is affirmative, the process proceeds to S9, and PM reproduction function is normal. ECU 50 repeats the process from S1 after S9. PM reproduction function determination unit 57 determines that S8 is negative, the process proceeds to S10, and PM reproduction function is abnormal. ECU 50 repeats the process from S1 after S10. When ECU 50 determines that PM reproduction function is abnormal, an alert to that effect may be displayed.

Effect

According to the present embodiment, since the differential pressure difference ΔP before and after regeneration is compared with the threshold P, it is possible to avoid erroneous determination as to whether or not PM regeneration function is operating properly without being affected by aging or the like of the second catalyst 16.

Second Embodiment

Figure 1B:
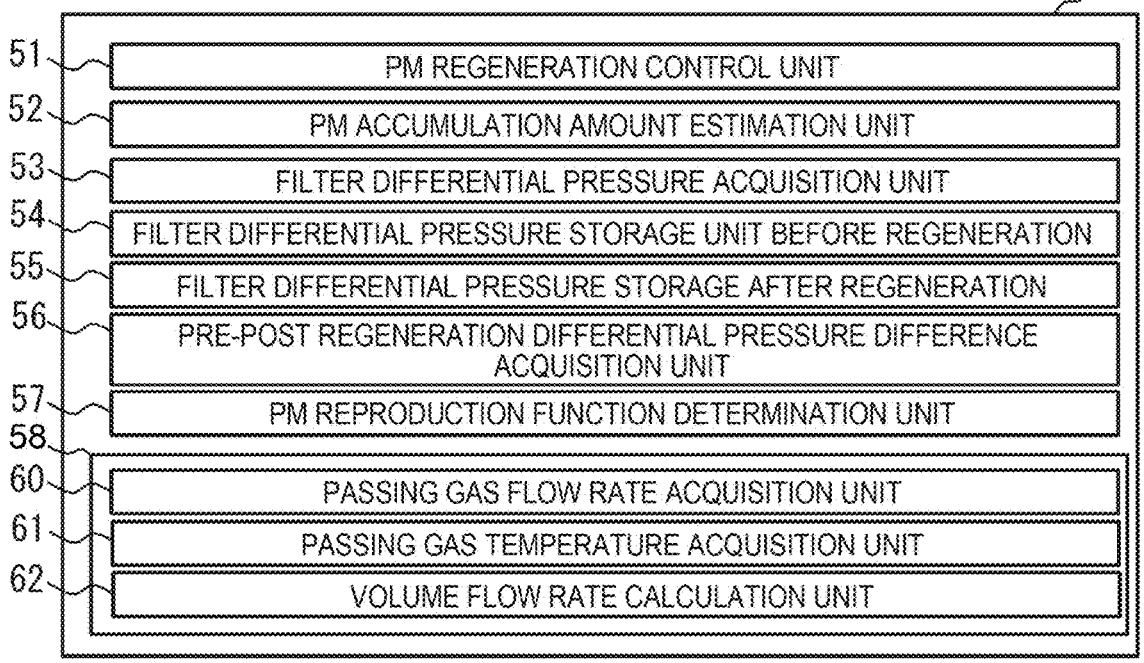
FIG. 1B is a functional block diagram of a control device according to a second embodiment.

In the second embodiment, an ECU 150 exemplified in FIG. 1B is provided instead of ECU 50 in the first embodiment. ECU 150 functions as each unit included in ECU 50 and also functions as a filter differential pressure correction unit 58. The filter differential pressure correction unit 58 includes a passing gas temperature acquisition unit 61, a passing gas flow rate acquisition unit 60, and a volume flow rate calculation unit 62. Other configurations of the second embodiment are the same as those of the first embodiment.

Figure 5A:
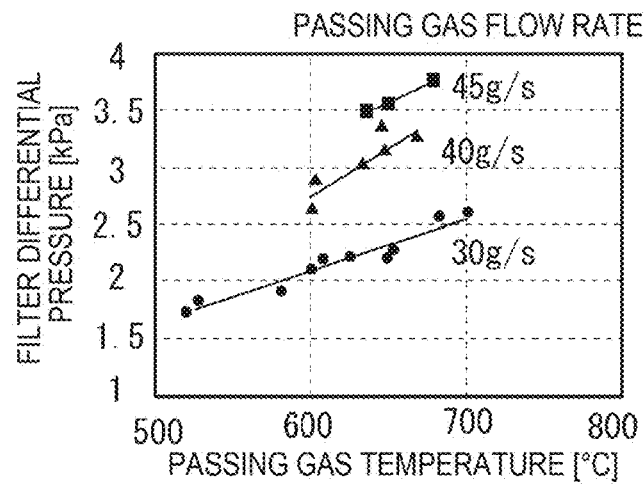
FIG. 5A is a graph illustrating the effect of the passing gas flow rate and the passing gas temperature on the filter differential pressure.

FIG. 5A illustrates the effect of the passing gas flow rate and the passing gas temperature on the differential pressure of the filters. In FIG. 5A, the differential pressure of the filters when the flow rate of the passing gas is 30 g/s is plotted for each passing gas temperature. In FIG. 5A, the differential pressure of the filters when the flow rate of the passing gas is 40 g/s is plotted for each passing gas temperature. When the flow rate of the passing gas is 45 g/s, the differential pressure is plotted for each passing gas temperature. The filter differential pressure increases as the flow rate of the passing gas increases. The filter differential pressure increases as the passing gas temperature increases. Therefore, in the second embodiment, PM regeneration function determination is performed using the regeneration pre-and-post differential pressure difference $\Delta P_{uni}$ in which the effects of the passing gas flow rate and the passing gas temperature are taken into account.

Figure 5B:
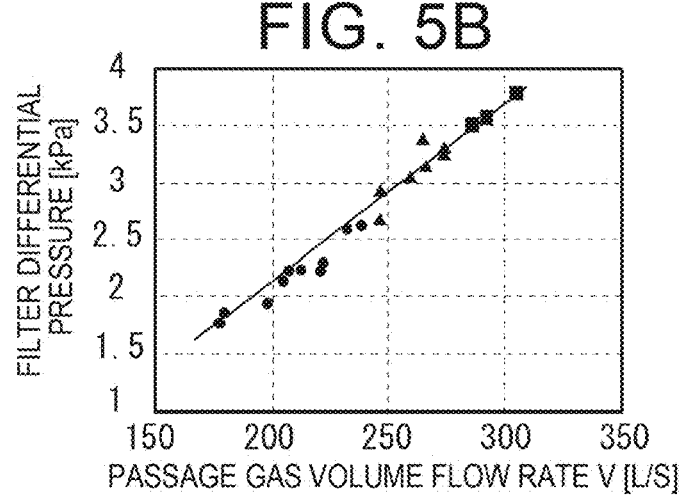
FIG. 5B is a graph illustrating the effect of volume flow rate on the differential pressure of filters.

The horizontal axis of the plot illustrated in FIG. 5B is the volume flow rate V of the passing gases passing through the second catalyst 16. In the graph in FIG. 5B, the values converted into the volume flow rates V are plotted for the respective gases for which the differential pressure of the filters is illustrated in FIG. 5A. By using the value converted into the volume flow rate V, the filter differential pressure can be compared under the same condition. That is, even if the passing gas flow rate and the passing gas temperature are different, it is possible to accurately determine PM regeneration function by using the filtered differential pressure corrected so that the volume flow rate V becomes the same value.

For conversion of each gas to the volume flow rate V, the following equation shown in [Equation 1] is used. The conversion to the volume flow rate V is performed by the volume flow rate calculation unit 62. Ga in Equation 1 is the flow rate of the passing gases. The passing gas flow rate Ga is detected by the airflow meter 12. The passing gas flow rate acquisition unit 60 acquires a detection value of the airflow meter 12. Gf in Equation 1 is the fuel-injection quantity. ECU 50 holds the fuel-injection quantity. The volume flow rate calculation unit 62 calculates a material amount n of the passing gas flow rate Ga and the fuel-injection amount Gf. GPF interior temperature $th_{ci}$ in Equation 1 is the interior temperature of the second catalyst 16. The internal temperature of the second catalyst 16 corresponds to the passing gas temperature. GPF inner-temperature $th_{ci}$ is obtained using a calculation model set in advance by experimentation or simulation. GPF inner temperature $th_{ci}$ is acquired by the passing gas temperature acquisition unit 61. The upstream pressure $P_{upst}$ is a detected value of the first pressure sensor 18a. The upstream pressure $P_{upst}$ may be estimated from the passing gas flow rate Ga.

By converting to the volume flow rate V, gases with differing flow rates and temperatures can be plotted in a generally single straight line, as shown in FIG. 5B.

Volume flow rate $V$=(Material amount of $Ga$ and $Gf$ $n$)×Gas constant $R$×($GPF$ interior temperature $th_{ci}$)/upstream pressure $P_{upst}$ (Mathematical formula 1)

Figure 6:
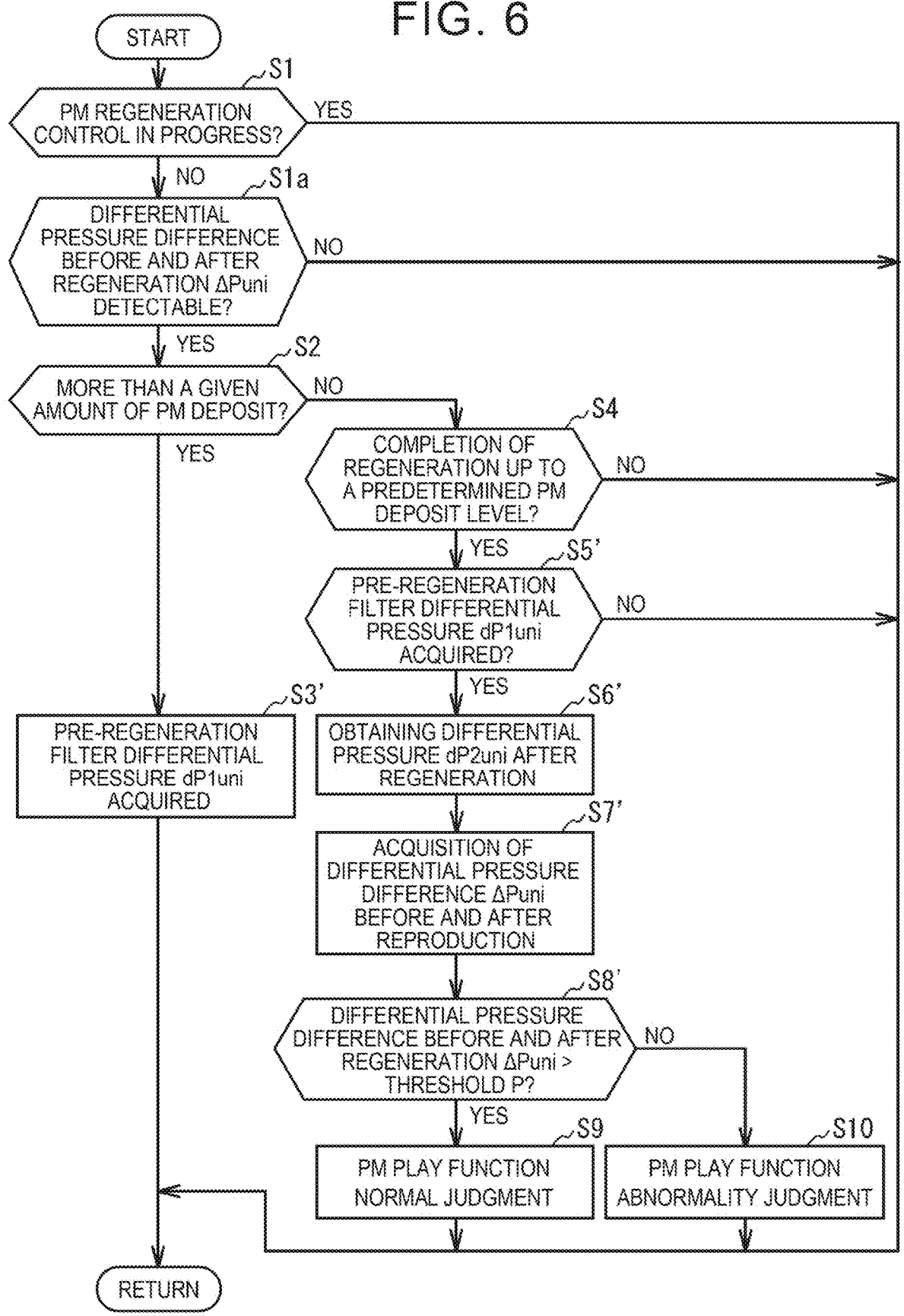
FIG. 6 is a flowchart illustrating an example of control according to the second embodiment.

Referring to the flow chart illustrated in FIG. 6, PM reproduction function determination in the second embodiment will be described. However, in the following description, differences from the first embodiment will be described. The flowchart of the second embodiment illustrated in FIG. 6 is different from the first embodiment in the following points.

In a second embodiment, a S1a is performed between S1 and S2. In the second embodiment, instead of S3, S5 to S8 in the first embodiment, S8' is performed from S3', S5'.

In S1a, ECU 50 determines whether the internal combustion engine 100 is in an operating condition capable of detecting the differential pressure difference $\Delta P_{uni}$. Specifically, ECU 50 determines whether the volume flow rate V falls within the differential pressure difference detecting area before and after regeneration, which is exemplified in FIG. 5C. When the volume flow rate V is small, it becomes difficult to detect the differential pressure difference $\Delta P_{uni}$ before and after regeneration. Therefore, the pre-regeneration differential pressure difference detection area is set as a range in which the pre-regeneration differential pressure difference $\Delta P_{uni}$ can be detected. When an affirmative determination is made in S1a, ECU 50 proceeds to S2. When a negative determination is made in S1a, ECU 50 repeats the process from S1.

Figure 5C:
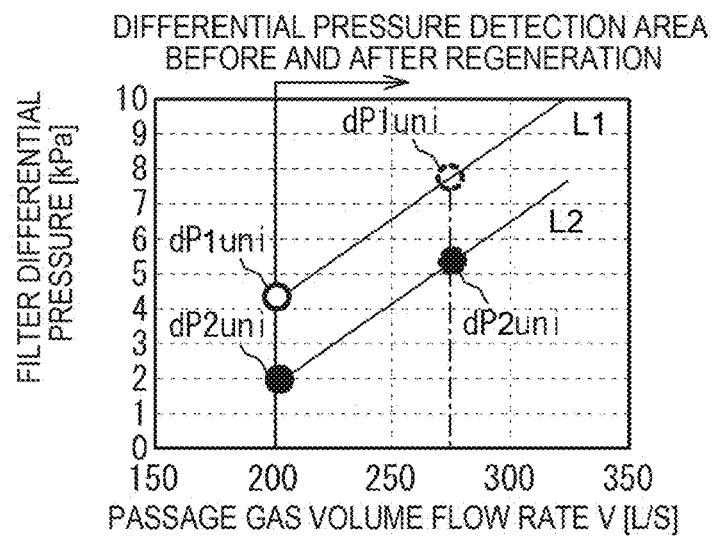
FIG. 5C is a graph illustrating that the differential pressure before and after regeneration is obtained by the pre-regeneration filter differential pressure corrected so that the volume flow rate becomes the same value and the differential pressure after regeneration is obtained.

In S3', the filter differential pressure acquisition unit 53 obtains the pre-regeneration filter differential pressure $dP1_{uni}$ corrected by the filter differential pressure correction unit 58. The obtained pre-regeneration filter differential pressure $dP1_{uni}$ is stored in the pre-regeneration filter differential pressure storage unit 54. The acquired pre-regeneration filter differential pressure $dP1_{uni}$ is stored in the pre-regeneration filter differential pressure storage unit 54. The line segment L1 shown in FIG. 5C is drawn by storing the data of the pre-regeneration filter differential pressure $dP1_{uni}$. After the process of S3', ECU 50 repeats the process from S1.

At S5', ECU 50 determines whether the pre-regeneration filtered differential pressure $dP1_{uni}$ has been acquired. When an affirmative determination is made in S5', ECU 50 proceeds to S6'. When a negative determination is made in S5', ECU 50 repeats the process from S1.

In S6', the filter differential pressure acquisition unit 53 obtains the post-regeneration filter differential pressure $dP2_{uni}$ corrected by the filter differential pressure correction unit 58. The obtained post-regeneration filter differential pressure $dP2_{uni}$ is stored in the post-regeneration filter differential pressure storage unit 55. The obtained data of the post-regeneration filter differential pressure $dP2_{uni}$ is stored in the post-regeneration filter differential pressure storage unit 55. After regeneration, the differential pressure $dP2_{uni}$ is accumulated, and thus the line segment L2 shown in FIG. 5C is drawn. After the process of S6', ECU 50 proceeds to S7'.

In S7', the pre-post regeneration differential pressure difference acquisition unit 56 obtains a pre-regeneration differential pressure difference $\Delta P_{uni}$. The pre-post regeneration differential pressure difference acquisition unit 56 extracts a combination of the pre-regeneration filter differential pressure $dP1_{uni}$ and the post-regeneration filter differential pressure $dP2_{uni}$ in which the volume flow rate V is the same from the line segment L1 and the line segment L2 in FIG. 5C. The combination of the pre-regeneration filter differential pressure $dP1_{uni}$ and the post-regeneration filter differential pressure $dP2_{uni}$ is extracted from the pre-regeneration differential pressure difference detecting area. The pre-post regeneration differential pressure difference acquisition unit 56 subtracts the post-regeneration filter differential pressure $dP2_{uni}$ from the extracted pre-regeneration filter differential pressure $dP1_{uni}$. ECU 50 proceeds after S7' to S8'.

In S8', PM regeneration function determination unit 57 determines whether or not the pre-regeneration differential pressure difference $\Delta P_{uni}$ is greater than the threshold P. Subsequent processing is the same as that of the first embodiment.

According to the present embodiment, it is possible to accurately determine PM regeneration function by using the filtered differential pressure corrected so that the volume flow rate V becomes the same value.

The above-described embodiments are merely examples for carrying out the present disclosure. The present disclosure is not limited thereto. Various modifications to these embodiments are within the scope of the present disclosure. Furthermore, it will be apparent from the above description that various other embodiments are possible within the scope of the present disclosure.

What is claimed is:

1. A control device for an internal combustion engine, in which an exhaust pipe connected to an engine body is provided with a filter that traps particulate matter (PM), the control device including a PM regeneration function to regenerate the filter that has trapped the PM, the control device comprising a processor, the processor is electrically connected to an airflow meter configured to detect an amount of intake air that is fed to the engine body,
a throttle valve opening degree sensor configured to detect an opening degree of a throttle valve configured to adjust an amount of the intake air,
a first pressure sensor configured to detect a pressure upstream of the filter, and
a second pressure sensor configured to detect a pressure downstream of the filter,
wherein the processor is configured to:
acquire a first PM accumulation amount, which is an amount of PM estimated to be accumulated on the filter before a regeneration, using an estimation model that takes detection values of the airflow meter and the throttle valve opening degree sensor as parameters;
determine whether the first PM accumulation amount is equal to or more than a first predetermined value;
acquire a pre-regeneration filter differential pressure that is a front-rear differential pressure of the filter before the regeneration, from the detection values of the first pressure sensor and the second pressure sensor, in response to determining that the first PM accumulation amount is equal to or more than the first predetermined value;
acquire a second PM accumulation amount, which is an amount of PM estimated to accumulate on the filter after start of operation of the PM regeneration function, using the estimation model;
determine whether the second PM accumulation amount is equal to or less than a second predetermined value, which is smaller than the first predetermined value;
acquire a post-regeneration filter differential pressure that is a front-rear differential pressure of the filter after the regeneration, from the detection values of the first pressure sensor and the second pressure sensor, in response to determining that the second PM accumulation amount is equal to or less than the second predetermined value;
acquire a pre-post regeneration differential pressure difference that is a difference between the pre-regeneration filter differential pressure and the post-regeneration filter differential pressure;
determine an abnormality in the PM regeneration function in a case where the pre-post regeneration differential pressure difference is equal to or less than a threshold value set in advance; and
display a warning indicating the abnormality in the PM regeneration function in response to determining that the PM regeneration function is abnormal.

2. The control device for an internal combustion engine according to claim 1, wherein the processor is further configured to:
calculate a first volume flow rate at a time when the pre-regeneration filter differential pressure is acquired and a second volume flow rate at a time when the post-regeneration filter differential pressure is acquired;
correct the pre-regeneration filter differential pressure and the post-regeneration filter differential pressure such that the first volume flow rate and the second volume flow rate are equal, and acquire a corrected pre-regeneration filter differential pressure and a corrected post-regeneration filter differential pressure; and
acquire the pre-post regeneration differential pressure difference from a difference between the corrected pre-regeneration filter differential pressure and the corrected post-regeneration filter differential pressure.

3. The control device for an internal combustion engine according to claim 2, wherein the processor is further configured to:
   acquire the first volume flow rate based on a temperature and a flow rate of a gas that has passed through the filter at the time of acquisition of the pre-regeneration filter differential pressure; and
   acquire the second volume flow rate based on a temperature and a flow rate of a gas that has passed through the filter at the time of acquisition of the post-regeneration filter differential pressure.

4. The control device for an internal combustion engine according to claim 2, wherein the processor is further configured to
   acquire the pre-post regeneration differential pressure difference in a region in which first the volume flow rate and the second volume flow rate are equal to or more than a predetermined value.

5. The control device for an internal combustion engine according to claim 1, wherein the processor is further configured to:
   determine whether the pre-regeneration filter differential pressure has been acquired; and
   acquire the post-regeneration filter differential pressure in response to determining that the pre-regeneration filter differential pressure has been acquired.

* * * * *